Figure 1:
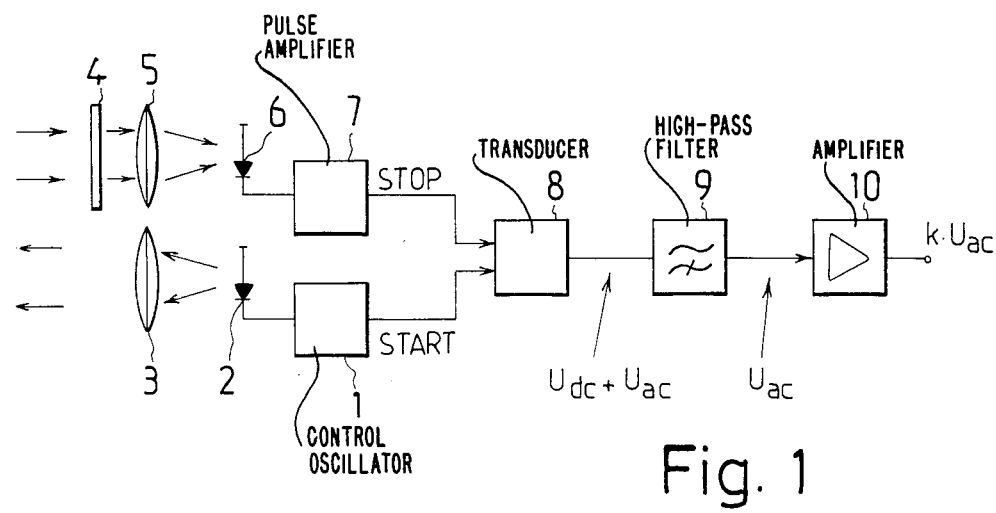

United States Patent [19]

Ahola et al.

[11] Patent Number: 4,637,727
[45] Date of Patent: Jan. 20, 1987

[54] PROCEDURE FOR ANALYZING RECIPROCATING MOTION

[76] Inventors: Raimo Ahola, Alppitie 7 A 28, 90530 Oulu 53; Risto Myllylä, Ketjutie 82, 90560 Oulu 56, both of Finland

[21] Appl. No.: 559,412

[22] Filed: Dec. 8, 1983

[30] Foreign Application Priority Data

Dec. 9, 1982 [FI] Finland ............................ 824240

[51] Int. Cl.⁴ .......................................... G01B 11/14
[52] U.S. Cl. .................................. 356/373; 162/263; 250/561; 356/5
[58] Field of Search .................... 356/4, 5, 28, 373; 250/548, 561; 162/263

[56] References Cited

U.S. PATENT DOCUMENTS 4,496,428 1/1985 Wells .............................. 250/561 X

FOREIGN PATENT DOCUMENTS 47760 4/1977 Japan ................................ 356/5

OTHER PUBLICATIONS

Berdahl, *NASA Tech. Briefs*, vol. 5, No. 4, Winter 1980, p. 433.

*Primary Examiner*—F. L. Evans

[57] ABSTRACT

A procedure for analyzing the reciprocating motion of a given object or its motion component transversal to the object's direction of travel, based on the passage time of electromagnetic radiation in the optical range and wherein by a light source, such as a laser or photodiode, a periodic light beam is directed on the object. The change of the passage times of light pulses that have travelled to the object and been reflected back therefrom, in relation to a given reference value, is transformed into an analog voltage proportional to the change.

8 Claims, 2 Drawing Figures

PROCEDURE FOR ANALYZING RECIPROCATING MOTION

The present invention concerns a procedure for analysing the reciprocating motion of an object or a motion component transversal to the direction of travel of the object, the procedure being based on the travel time of electromagnetic radiation in the optical range, in which with a light source, such as a laser or a photodiode, a periodic light beam is directed on the object.

In a number of industrial applications, one should be able to analyse the motion of reciprocatingly moving or oscillating objects. One example of this is the measurement of the fluttering of the paper in a printing press (and also on the paper machine). The fluttering of the paper in a printing press is influenced e.g. by the web tension, the eccentricity of the reels, the forces created in the printing event, etc. For maximum runability of the printing press, the fluttering should be minimized, since the probability of a web break is then smaller.

In this instance, in order to find the cause of the fluttering, it should be possible to analyse the transversal motion of the paper web. Analysis both in the time and the frequency domain would furnish valuable information about the motion of the paper and its causes. The information about the amplitude of motion could be utilized, for instance, as a parameter affecting the paper web tension control. Measurement of the asymmetry of the paper reel, as one of the flutter-inducing factors, would also be important.

Another example of application of reciprocating motion analysis is the study of the mechanical stresses, vibration, etc. caused by an oscillating work machine or equivalent. In this instance, it would be necessary to be able to measure and analyse the motion in detail. It would frequently be advantageous—even indispensable—that the measuring could take place without touching the object.

In the above examples, the information required about the target is the amplitude in both directions with reference to the equilibrium position characteristic of the object. The amplitude measurement should be independent of the distance between the object and the measuring instruments so that in conjunction with the measuring event highly accurate mounting of the instrument could be avoided. It should be possible to transform the motion amplitude into a continuous voltage signal proportional thereto (e.g. 10 mV/1 mm or another suitable ratio) so that the motion could be analysed by commonly available analysing instruments, such as a recorder, an oscilloscope and a spectrum analyser.

Apparatus suitable for use in applications like those mentioned that can be contemplated may be based on application of change of capacitance, of ultrasound or of light.

The drawback of capacitive measurement is its narrow measuring range, the result dependent on the material of the object, and the need of a specific pick-up for each application.

Ultrasound can be used both on the echo principle and on the Doppler principle. However, the velocity of sound propagation is essentially dependent on the movement and temperature of the medium (air). The signal obtained by the Doppler principle is proportional to velocity. Thereby, however, the measuring of low frequency motions is inconvenient; in addition, the efficient bundling of ultrasound into a narrow measuring beam is difficult, and therefore the measuring instrument should be very close to the object. The accuracy and resolution of an instrument based on ultrasound would also be inadequate when measuring rapidly moving objects.

Light can be used in several different ways. One way is to collineate on the object a suitable light point or bar and to study the motion or the shape of this point or bar at an oblique angle with some kind of electro-optical "camera", i.e., an apparatus producing a signal proportional to the movement of the point or to the curving of the bar. The drawback of this procedure is the exact geometry defined by the optics and the detectors, fixed measuring distance and high price of the apparatus if for instance video cameras and bands of light are used.

Using the Doppler principle is also possible with light. A limitation is, however, as in the case of ultrasound, the measuring of low frequencies. It is also possible to use an optical proximity switch (based on intensity measurement of reflected light) for measuring a change of distance. In this instance, the result is harmfully influenced by the variations of the object's coefficient of reflection (e.g. printed paper).

The distance measuring method based on the passage time or phase comparison of a conventional light pulse does not yield good enough resolution with desired speed so that the motion of the object could be inferred from the difference of distances. Accurate information on the distance between the object and the measuring apparatus is no use at all when the specific endeavour is to measure a reciprocating oscillation of the object; distance measuring instruments have been optimized for the "wrong" measuring data in view of oscillation measurement.

If with the measuring instrument also absolute distance is measured, the distance measuring range and consequently the time interval measuring range of the electronics measuring the passage time of a light pulse must be selected large in comparison with the case in which nothing but the change of the passage time in relation to a reference value is measured.

The short time span mode of measurement yielding the best resolution is analog measurement. By analog measuring procedures a resolution of about $10^{-4}$ of the whole measuring range is achieved; roughly speaking, the relative value of the resolution is independent of the measuring range. For instance, the procedure disclosed in the U.S. patent application No. 496,429, filed May 20, 1983, wherein also the absolute value of distance is measured, does not yield the best possible result in an instance when it is only desired to study a small reciprocating motion of the object; the relative resolution $10^{-4}$ mentioned amounts to 20 mm in the case of a measuring range of 200 m, but with 2 m measuring range it is only 0.2 mm, or quite more accurate.

The problems mentioned in the foregoing can be eliminated by applying the pulse principle in the manner that the measuring apparatus only records the change of distance relative to a reference value.

Therefore, the invention is characterized in that the change in the passage times of light pulses that have travelled to the object and been reflected back therefrom, in relation to a given reference value, is transformed into an analog voltage proportional to said change. The result is a measuring procedure which is independent of the distance from the object. Further advantages are: high accuracy and power of resolution thanks to the high frequency of the light source and to the narrow measuring range, good possibilities for focussing, which make the procedure versatile, and insensitivity to the object's material.

An advantageous embodiment of the invention is characterized in that the voltage proportional to the change of passage time and thereby to the change of distance is obtained by high-pass filtering and appropriate amplification, from the voltage proportional to the passage time. This is one of the ways to "subtract" from the incidental passage time the mean passage time, whereby the difference represents the momentary location of the object in relation to the average location (or state of rest). Only the difference is transformed into a voltage proportional thereto.

Another advantageous embodiment of the invention is characterized in that the voltage proportional to the change of the passage time is obtained by delaying a time signal derived from the outgoing light pulse in such manner that the delayed time signal tends to become controlled to be simultaneous with the time of arrival of the echo pulse, whereby information on the change of distance is obtained from the change of delay that is necessary. The change of delay (or the need of change) will then represent the change in passage time and thereby the reciprocating motion of the object. Information about the change of delay or the need of such change is obtained, for instance, from the signal controlling the delay.

An advantageous embodiment of the invention is characterized in that the signals indicating the velocity and/or acceleration of the motion are produced from the voltage proportional to the change of distance by dividing and/or derivating it appropriately with regard to time. Thus, it is possible to expand the system measuring merely reciprocating motion to become a versatile analyser, with the aid of which changes of the motion and their causes can be better analysed.

An advantageous embodiment of the invention is also characterized in that the voltage proportional to the change of passage time and therefore to the motion of the object that is obtained is analysed in the time and/or frequency domain, applying analysing apparatus known in the art, such as a recorder, an oscilloscope or a spectrum analyser. When the present procedure is being applied, it is of course to advantage if conventional standard apparatus can be used to display and to record the results of measurement. When analysing in the frequency domain, the spectrum of the motion is elicited.

An advantageous embodiment of the invention is moreover characterized in that the analog voltage is transformed by suitable coding into binary form for further processing and/or analysing. After the analog voltage has been transformed into digital form, all processing facilities afforded by a computer are applicable.

A typical embodiment of the invention is characterized in that in the procedure the flutter of the paper in a printing press or on a paper machine is measured and/or analysed during the run.

Figure 2:
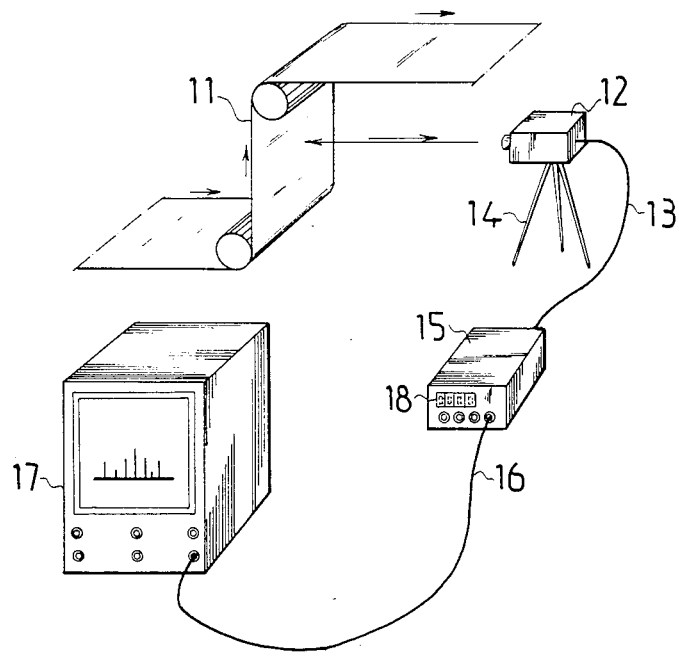

The invention is described in the following in closer detail by the aid of an example by referring to the drawing attached, wherein:

FIG. 1 presents a simple principle circuit how the motion in relation to the equilibrium position of an object in reciprocating motion can be transformed into a voltage proportional thereto, FIG. 2 presents a means applying the procedure in analysing the flutter of a paper web.

In FIG. 1, the control oscillator 1 conducts brief current pulses to the laser diode 2 at a high frequency, and the light pulses hereby produced in the laser 2 are collected into a narrow measuring beam by a collecting lens 3. The principle is approximately the same as in conventional distance measuring means, but since the measuring range is quite much smaller (typically 0–2 m), the power required is also less. Therefore, a component can be selected to serve as laser which can be pulsed at a frequency up to several decades higher than is feasible in conventional distance measuring means. The light pulse reflected from the object is filtered from the background light by the filter 4 and focussed with the lens 5 onto the photodiode 6, which may be e.g. an avalanche photodiode.

The signal received from the photodiode 6 is amplified by a pulse amplifier 7, from the output of which one of the two time signals related to the passage time of the light pulse (the STOP signal) is obtained. The other time signal, START, is obtained from the control oscillator 1. For instance by means of a time span/voltage transducer 8 applying conventional principles of operation, the time between the time signals is transformed into a voltage proportional thereto. (The transducer 8 also features low pass filtering by which the signal is made into a continuous signal). The voltage that is obtained contains both a d.c. component $U_{dc}$ and an a.c. component $U_{ac}$.

The voltage $U_{dc}$ is directly proportional to the sum of the time which the pulse has been travelling in the electronics part and of the time passed in the form of light. Therefore, it carries information about the absolute distance. The voltage $U_{ac}$, again, is only proportional to the momentary location of the object in relation to its average position. Thereby, it represents the reciprocating motion of the object in relation to the point of equilibrium.

In ordinary distance measuring, efforts are made to eliminate in one way or another from a voltage corresponding to the voltage $U_{dc}$ the contribution arising from the delay in the electronics, whereby only a voltage proportional to the passage time of the light pulse will be left. These measuring means have been designed to operate in conjunction with a stationary object and therefore there appears no component corresponding to $U_{ac}$.

A simple way to eliminate the d.c. component not needed in motion measurements is filtering with a high pass filter 9, which at the same time defines the low limit frequency of the voltage proportional to the motion. The signal $U_{ac}$ obtained is amplified with the amplifier 10, whereby the final result that is obtained will be a voltage $k \times U_{ac}$, scaled with the desired coefficient, and which is directly proportional to the reciprocating motion of the object.

If the distance between the measuring device and the object is 2 m and the amplitude of the reciprocating motion 2 cm, the amplitude of the voltage $U_{ac}$ is only 1/100 of the value of the voltage $U_{dc}$. Therefore, elimination of $U_{dc}$ is indispensable so that $U_{ac}$ can be amplified to be large enough for conventional analysing apparatus.

Another conceivable way to realize the procedure based on measuring the change of the passage time of the light pulse is as follows. Between the control oscillator 1 and the transducer 8 of FIG. 1 is inserted an electronically self-controlling delay for the START pulses. The transducer 8 is replaced by a mere timing comparator which indicates which of the pulses (STOP or the delayed START) comes first. Based on the result, the START pulse obtained from the control oscillator 1 is delayed either more or less. The electronics aim to control the timing pulses to be simultaneous at all times. The change of the delay (or the "need of change") then represents the change of the passage time and thus the reciprocating motion of the object. Information about the changing of the delay (about the need of change) is obtained, for instance, from the signal controlling the delay. The rate at which the delay is controlled will then determine the low limit frequency of the measurement.

For realizing in practice the procedure presented in the present invention, an innumerable multitude of various possibilities naturally exist.

In the following practical example, the arrangements of which FIG. 2 illustrates, the typical performance values are mainly based on experimental results obtained with the prototype of an apparatus applying the procedure.

On the paper web 11, constituting the object, which progresses at high speed and flutters in transverse direction, are directed in a narrow measuring beam from the transmitter/receiver unit 12 (the so-called measuring head) short light pulses at a very high frequency (typically over 1 MHz). The measuring head 12 connects over a cable 13 with the electronics part proper 15. The measuring head 12 has been fixed on a suitable support 14 for ease of aiming. The measuring head 12 and the electronics part 15 in combination form a voltage proportional to the change of the passage time of the light pulses sent out and reflected from the paper. Since the velocity of propagation of the light pulse is constant with rather high accuracy, the voltage thus obtained is directly proportional to the motion of the object 11. The voltage can be scaled e.g. with an amplifier in a desired ratio (e.g. 10 mV/1 mm).

The voltage that is produced is independent of the distance between the measuring head 12 and the measured object 11. Therefore, the measuring head 12 can be placed with considerable freedom. A typical allowable distance range can be e.g. 0-2 m. The voltage obtained in the measurement has been connected by a cable 16 to the spectrum analyser 17, whereby on the latter's display screen are directly seen the characteristic frequency components associated with the fluttering and their amplitudes.

The electronics part 15 also comprises a separate numerical display 18, showing the amplitude of flutter in millimeters. Other quantities describing the moovements of the object may equally be shown on the display 18.

The measurement of change of distance (=the obtainable voltage proportional to the reciprocating motion) has a finite low and high limit frequency. The time constant determining the low limit frequency is in principle confined by the permitted length of settling time of the measuring means. If a settling time e.g. not more than 1 min is allowed on displacing the measuring head 12, 1 m with reference to the object 11 and if the required measuring accuracy is 1 mm, the minimum of the low limit frequency is approximately 0.02 Hz. The upper limit frequency is dependent not only on the measuring frequency employed but also on the requisite forming of the mean, in order that the desired accuracy of measurement might be attained. In practice, the mean value calculation required is therefore also dependent on the capacity of performance of the electronics forming the voltage proportional to the change of passage time. With present-day technology, a top limit frequency at least about 200 Hz is attainable with resolution better than 1 mm, and this is adequate in view of most applications. The smaller the upper limit frequency, the better the resolution and accuracy that can be achieved.

In applications like that of FIG. 2, a continuous echo is easily obtained from the object because all light pulses hit the object. In some applications, surfaces other than the object surface proper may interfere with the measurement, unless a separate reflector is provided at the desired point of measurement. The echo obtained from a reflector is powerful enough to override disturbances of measurement from echos originating elsewhere. When a reflector is used, the lateral motion of the object must remain within the limits of the light beam, but this is rarely a problem because the motions being measured are small.

It is obvious to a person skilled in the art that different embodiments of the invention are not exclusively confined to the example presented in the foregoing but may vary within the scope of the claims presented below.

We claim:

1. A method of measuring the reciprocating motion of a given object transverse to the running direction of the object, comprising the steps of: directing periodic light pulses on the object; receiving light pulses reflected back from the object; determining the change in the passage time between subsequent light pulses directed onto and reflected back from the object, in relation to a reference value; transforming said change into an analog voltage signal proportional to said change; and interpreting the alterations in said analog voltage signal as being proportional to alterations in position of the object in a direction transverse to the running direction of said object.

2. A method according to claim 1, including obtaining the voltage signal proportional to the change of passage time by highpass filtering and amplification of a voltage signal proportional to the absolute passage time of the light pulses to said given object.

3. A method according to claim 1, including obtaining the voltage signal proportional to the change of passage time by controlling the delay of a timing signal that triggers the light pulses directed to the object in such a manner that the delayed timing signal is made simultaneous with the detected arrival of a reflected light pulse, to thereby obtain from a control signal, reflecting the necessary change of the delay time due to the motion of said object, a measurement of the change of distance of the object.

4. A method according to claim 1, including converting the signal proportional to said change in the passage time into a signal indicating velocity of the reciprocating motion.

5. A method according to claim 1, including converting the signal proportional to said change in the passage time into a signal indicating acceleration of the reciprocating motion.

6. A method according to claim 1, including converting the signal proportional to said change in passage time into a frequency signal.

7. A method according to claim 1, including converting the analog voltage signal into binary form.

8. A method according to claim 1, wherein the object is a moving paper, and the motion analysed is the flutter of the paper.

* * * * *